Jan. 29, 1952  G. K. MURPHY  2,583,960
PASSENGER ACCOMMODATIONS FOR RAILWAY CARS AND SIMILAR VEHICLES
Filed June 18, 1949  5 Sheets-Sheet 1

INVENTOR.
Goodrich K. Murphy
BY
Maurice A. Crews
ATTORNEY

Jan. 29, 1952  G. K. MURPHY  2,583,960
PASSENGER ACCOMMODATIONS FOR RAILWAY CARS AND SIMILAR VEHICLES
Filed June 18, 1949  5 Sheets-Sheet 3

INVENTOR.
Goodrich K. Murphy
BY
Maurice A. Crews
ATTORNEY

Jan. 29, 1952  G. K. MURPHY  2,583,960
PASSENGER ACCOMMODATIONS FOR RAILWAY CARS AND SIMILAR VEHICLES
Filed June 18, 1949  5 Sheets-Sheet 5

INVENTOR.
Goodrich K. Murphy
BY
Maurice A. Crews
ATTORNEY

Patented Jan. 29, 1952

2,583,960

UNITED STATES PATENT OFFICE 2,583,960

PASSENGER ACCOMMODATIONS FOR RAILWAY CARS AND SIMILAR VEHICLES

Goodrich K. Murphy, New Canaan, Conn., assignor to The Budd Company, Philadelphia, Pa., a corporation of Pennsylvania Application June 18, 1949, Serial No. 99,900

16 Claims. (Cl. 105—315)

1

The invention relates to a passenger-carrying vehicle, such as a railway car, having a center aisle and convertible seating and sleeping accommodations arranged on both sides of the center aisle and for the major portion of the length of the vehicle. It has particular reference to an arrangement in such vehicles which will accommodate a maximum number of passengers with private rooms arranged with their seating and standing spaces at car floor level and equipped so that the passengers may either sit or recline full length in the rooms.

It is a main object of the invention to provide an arrangement, which is intermediate in comfort and desirability and in number of passengers accommodated and in cost of manufacture and operation, between the so-called "roomette" type of accommodation, as shown for example in Patent No. 2,147,011, Crawford, issued February 14, 1939, and the so-called "sleeper coach" type of accommodation in which double rows of seats adjustable to an inclined reclining position are provided on both sides of a center aisle.

The arrangement according to the invention compares favorably in comfort and convenience to the "roomette" type of accommodation, being designed to have substantially the same appurtenances in the rooms thereof, and is more desirable than the arrangement of the sleeper-coach type because of the greater room afforded each passenger and the greater privacy which it provides.

While the total number of passengers which it is possible to accommodate by this arrangement is somewhat less than the number accommodated in a so-called "sleeper coach," it is materially greater than the number accommodated in a "roomette." Instead of from 20 to 22, accommodated in a "roomette," the new arrangement may accommodate from 36 to 42 in a car of standard length of 85' between bumpers.

These objects and advantages are achieved by a compact room arrangement along both sides of the center aisle and between it and the car side wall. The rooms are arranged to overlap at their ends both vertically and transversely, the main bodies of the transverse walls being separated longitudinally just sufficient to provide comfortable sitting in the rooms on seats facing longitudinally and in the same direction. The seats are disposed adjacent a main body portion of a transverse wall and are of a comfortable width to seat one person, being somewhat greater in width than one-half of the width of a room. In the preferred arrangement, the seats are arranged in the adjoining rooms alternately along the aisle and the car side walls, and to obtain sufficient length in the respective rooms for a full-length berth, the transverse partitions are provided laterally of the seats and between the respective seats and the adjacent longitudinal wall (car side or aisle wall) opposite with offset portions providing longitudinal extensions or boots of materially less width and height than the rooms, these extensions or boots providing the necessary length in each room for receiving a full-length berth or couch on which the occupant may recline at full length. The extension or boot associated with each room is directly in front of the seat therein and by providing a fixed berth portion in the boot and extending the seat and seat back to horizontal position level with the fixed berth portion, the room can be readily converted into a sleeping room with a full-length berth.

According to the invention, the rooms of a car may all be of the single-occupancy type, with the seats and beds arranged alternately along the aisle wall and the car side wall, or such single-occupancy rooms may be combined with double-occupancy rooms in several different combinations, as will become evident later on.

In the preferred form, the berths in the single-occupancy rooms are all arranged at the same low level, at approximately seat height, but in another form they may be arranged alternately at low and high levels. In this latter arrangement, the boots or extensions for receiving one end of the berths are, of course, arranged alternately adjacent the floor and adjacent the ceiling. The high-level berths are preferably at a height sufficient to provide head room for sitting in the seats provided under the high-level berths.

Other and further objects and advantages and the manner in which they are attained will become clear from the following detailed description when read in connection with the accompanying drawings forming a part of this specification.

Figure 1:
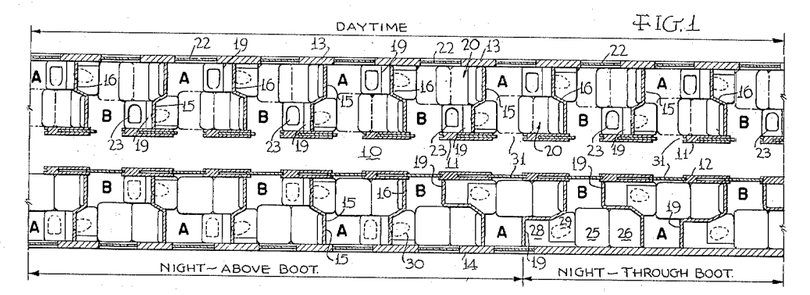
Fig. 1 is a sectional plan view of a portion of the length of a railway car equipped with single-occupancy rooms according to a preferred form of the invention, the rooms at the top of the view being shown made up for daytime or sitting use, and the rooms at the bottom of the view being shown made up for night-time or reclining use, the section through the rooms at the left (bottom) being taken above the extensions or boots and the section through the rooms at the right (bottom) being taken through the extensions or boots.
Figure 5:
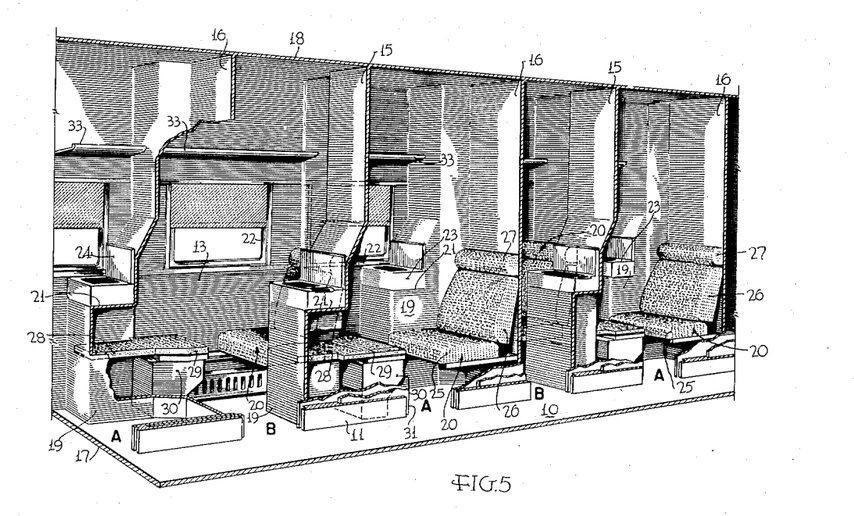
Fig. 5 is an enlarged fragmentary perspective view of the rooms arranged as shown at the top of Fig. 1, the view being taken looking at an angle toward the outside wall of the car from the aisle, and the aisle wall and parts of the transverse walls being broken away to show more clearly the arrangement of the interior of the rooms.
Figure 6:
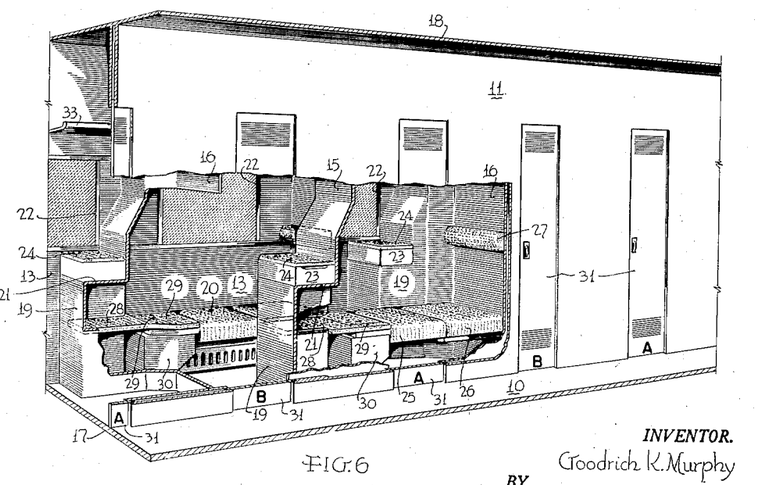
Fig. 6 is a similar view of a series of rooms, shown made up for nighttime or reclining use, corresponding to the arrangement at the bottom of Fig. 1, the parts being less extensively broken away to show more of the aisle wall and the doorways and doors in the aisle wall leading to the rooms.
Figure 7:
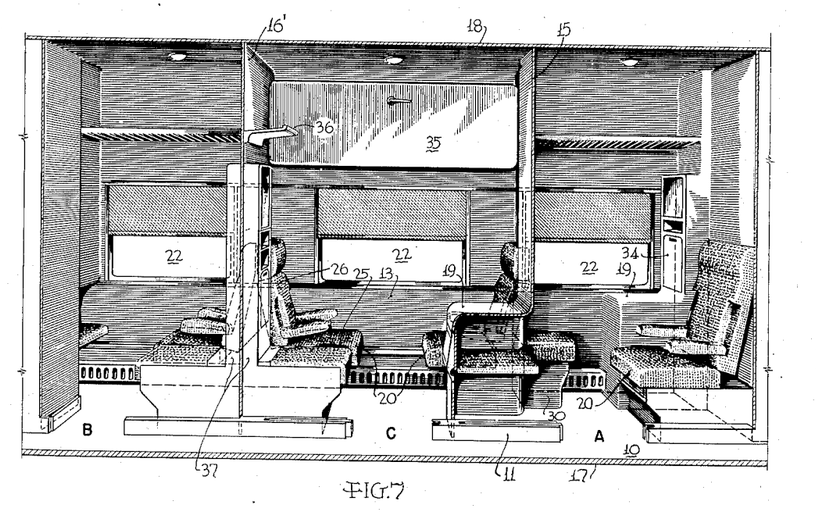
Fig. 7 is an enlarged fragmentary perspective view of a series of three rooms arranged as shown in full lines at the top of Fig. 3, the view looking directly toward the car side wall from the aisle, most of the aisle wall and parts of the transverse walls or partitions being broken away to show more clearly the interiors of the rooms.

Referring now to the preferred form of the invention as shown more particularly in Figs. 1, 5 and 6, it will be seen that a series of rooms designated A, B A, B, etc., is arranged on each of the opposite sides of the longitudinally extending center aisle 10 of a railway car, or similar vehicle, each series occupying the space between the adjacent longitudinally extending aisle wall 11 or 12, and the longitudinally extending car side wall opposite, 13 or 14. Since the rooms on the opposite sides of the aisle are similarly arranged, it will suffice for an understanding of the invention to describe but one series, those arranged in the space between the aisle wall 11 and the car side wall 13. Each room is bounded by the car side wall, as 13, the aisle wall, as 11, and the longitudinally spaced transverse walls 15 and 16 interconnecting the car side and aisle walls. All these walls extend between the car floor 17 and the ceiling 18. Thus, all the rooms have their floors at the level of the aisle floor and are of uniform height in their main bodies.

For convenience of description, the term "forward" will be used to designate the ends of the rooms toward which the seated occupants face, and the other ends of the rooms will then be termed their "rearward" ends. Similar reference characters will be used in the various views of the drawings to designate similar parts.

The transverse walls 15 and 16 as shown, have their main bodies slightly longitudinally offset intermediate the side and aisle walls thereof so as to provide somewhat greater length of the main bodies of the rooms in the longitudinal region of the seats. It will be seen that the offsets are alternately in opposite directions so that the greater length of the main bodies of the rooms is alternately disposed adjacent the aisle wall, as 11, and adjacent the car side wall, as 13. The rooms having their greater length adjacent the aisle wall are designated A, and the intermediate rooms having their greater length adjacent the car side wall, are designated B.

To conserve space, the length of the main bodies of the rooms is just sufficient to permit comfortable seating therein with adequate leg room.

In their lower portions, each of the transverse walls or partitions 15 and 16 is provided with a longitudinal offset forming with the adjacent longitudinally extending side or aisle wall and floor, a longitudinal extension or boot 19, this boot being provided to afford sufficient length of the room in this region to receive a full-length berth or couch.

The alternate rooms, designated A, have their extensions or boots 19 arranged adjacent the aisle wall 11 and the intermediate alternate rooms, designated B, have their boots 19 extending adjacent the car side wall 13. In each of the rooms, a seat 20 is arranged with its back adjacent the transverse wall opposite the recess formed by the boot and the opening into the room. Thus, the seats in the rooms designated A are arranged adjacent the aisle wall, as 11, and the seats in the rooms designated B are arranged adjacent the car side wall, as 13, the seat in each room being in longitudinal alignment with the associated boot.

The seats are of a width somewhat greater than one-half the maximum width of the rooms to provide comfortable seating for the occupants, and the boot 19 from an adjoining room extends alongside the seat and fills the remaining width between the seat and the longitudinally extending wall (aisle or car side) remote from the seat.

The boots 19 are of a height materially less, say less than half, the maximum room height, and have their flat horizontal top portions 21, Figs. 5 and 6, below the level of the sills of the windows 22 provided, one for each room, in the car side wall 13. These flat top portions 21 of the boots may be used to mount washbasins, as 23, which are normally closed by a cover 24, see Fig. 6.

Each seat back is disposed against a generally planar portion of the transverse wall 15 or 16 extending inwardly from the aisle or the car side wall, depending on whether the seat is disposed in an "A" room or in a "B" room.

Each seat 20 may comprise a movable seat cushion 25, a movable seat back 26 and a head rest 27. See Figs. 5 and 6.

Within each boot 19 is arranged a fixed berth portion 28 at about the level of the seat cushion 25, this berth portion being extended, as shown, by a hinged cover 29 for a hopper 30. By extending the seat cushion and seat back to the horizontal position, where they are supported in a usual way, they are aligned with the fixed berth portion and form therewith a full-length berth or couch upon which the occupant may recline full length, see Fig. 6 and bottom of Fig. 1.

It will be noted that when the rooms are so made up for nighttime or reclining use, adequate standing space for washing and dressing is provided alongside the berth in each room.

With this arrangement, the occupant of a room may be provided with individual washing and dressing and toilet facilities and is assured of full privacy, each room being accessible from the aisle through a single doorway and door 31, which he may keep in closed and locked condition.

Figure 4:
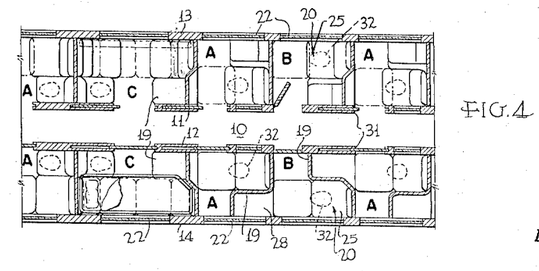
Fig. 4 is a fragmentary view similar to Fig. 3 showing a slightly different combination of rooms and arrangement of appurtenances in the single-occupancy rooms from those shown in the preceding figures.

The hopper 30 is arranged at a sufficient distance from the seat 20 to provide adequate foot room for a seated passenger, but more foot room may be provided, if desired, by adopting the arrangement of Fig. 4. In this arrangement, the opening in the hopper seat is indicated in dotted lines at 32, the hopper being arranged under the seat cushion 25 which can be raised to provide access to the hopper.

Other appurtenances for the convenience of the passengers may be provided in each room. Among them may be mentioned a baggage rack 33 for each arranged along the car side wall 13 above the window opening 22 therein.

With the preferred arrangement described hereinbefore, it is possible to provide, in a standard passenger car length of 85' between bumpers, private room accommodations equipped for day and night travel for at least 36 passengers, and to provide these rooms with all the usual conveniences.

Of course, the same room arrangement could be used, if desired, without the hoppers and washbasins in each room, thus making the accommodation somewhat more roomy and more economical to build and operate. In such case, the usual large wash rooms at the ends of the car could be provided to take care of the washing and toilet facilities required by the passengers.

Figure 2:
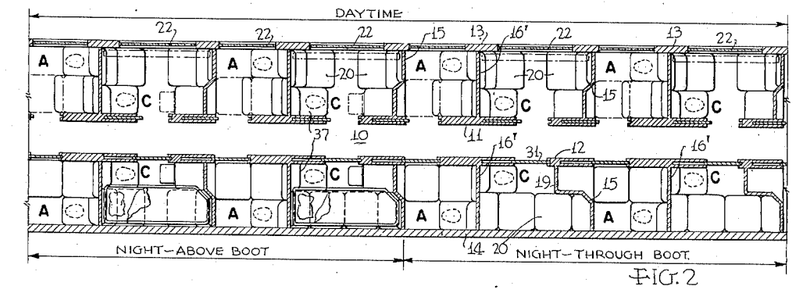
Fig. 2 is a view similar to Fig. 1 in which one form of single-occupancy room of the type shown in Fig. 1 is combined in alternating arrangement with double-occupancy rooms.

Referring now to the arrangements shown in Figs. 2, 3, 7 and 8, it will be seen that rooms of the "A" and "B" type of Fig. 1, may be readily combined in several ways with double-occupancy rooms, designated C, so as to materially increase the passenger capacity of the car. As shown in Fig. 2, double-occupancy rooms C are arranged alternately with rooms A and in Fig. 3, rooms C are interposed between rooms A anad B with a pair of rooms A and B disposed between successive rooms C.

With either of these arrangements, the forward transverse wall 15 of room A separating it from room C is entirely similar to the transverse walls 15 in Fig. 1. Room C has seats 20 facing each other and arranged along the car side wall 13 and the boot or extension 19 from the adjoining room A extends into the space between the adjacent seat 20 of room C and the aisle wall 11 in the same manner as the boot from room A extends between the seat 20 of room B and the aisle wall in the arrangement of Fig. 1.

In the modified arrangement (Fig. 3), the room A may have the hopper 30 arranged alongside the car side wall 13 in the corner of the room diagonally opposite the seat. The boot 19 from an adjacent room B, Figs. 3, 7 and 8, extends into the room A alongside the seat 20, as in the arrangement of Fig. 1, and the folding washbasin and cabinet 34 may be arranged against the transverse wall directly over the boot 19, Fig. 8.

The transverse wall 16' of the room C opposite the wall 15 is a planar wall and is arranged at approximately berth length away from the main body of wall 15. The two facing seats 20 can be readily converted into a lower berth by sliding the seat cushions 25 and seat backs 26 forwardly to horizontal berth-forming position shown in Fig. 8.

To provide sleeping accommodations for a second person in the "C" rooms, a usual form of upper berth 35 folding against the car side wall may be provided. A baggage rack 36 is provided on the transverse wall 16' and a combination hopper, washbasin and cabinet unit 37 is arranged in the space between the adjacent seat 20 and the aisle wall 11.

To reach the upper berth, a folding step 38 is provided on the boot 19 from which the passenger can step upon the flat top of the boot to enter the berth.

Figure 3:
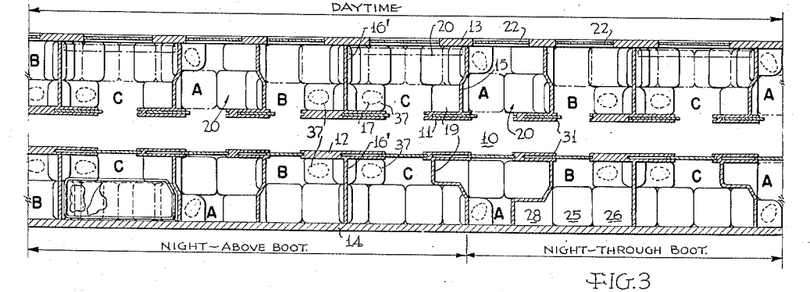
Fig. 3 is a view similar to Fig. 1 in which both forms of single-occupancy rooms of the type shown in Fig. 1 are arranged in longitudinal series with double-occupancy rooms.
Figure 8:
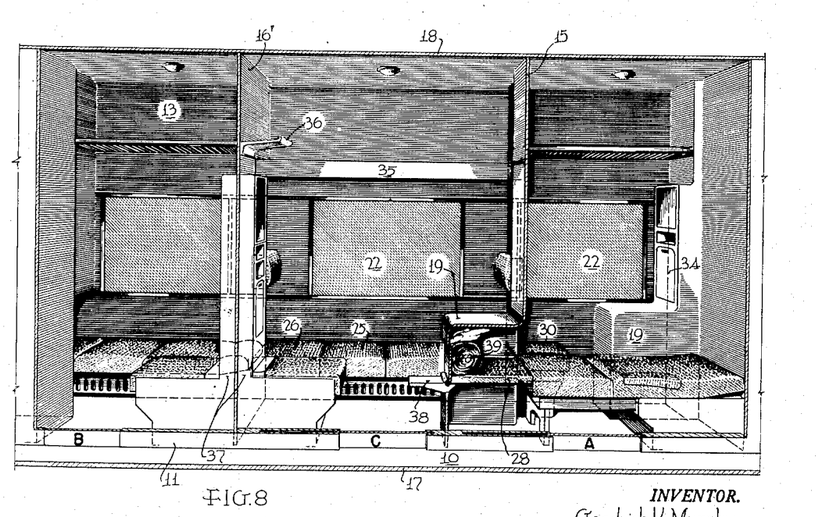
Fig. 8 is a view similar to Fig. 7, showing the rooms made up for nighttime or reclining use as shown at the bottom of Fig. 3.

As shown in the room A of Fig. 8, the bedding 39 may be stored on the fixed berth portion in the recess formed by the boot 19, and this may be done in all "A" and "B" type rooms.

Where a room A and B has one of its transverse walls formed by the planar wall 16' separating it from a room C, as shown in Figs. 2 and 3, a toilet and folding washbasin and cabinet unit, as 37, may be arranged against the wall 16' and disposed alongside the seat 20, thus making these "A" and "B" rooms so combined with a "C" room somewhat more convenient and roomy than in the arrangement of Fig. 1.

Where the toilet is arranged alongside the berth, as in room A, Fig. 8, the seat back and head rest may be integrated and together moved to the horizontal position as shown to form with the seat cushion and the fixed berth portion in the boot, the full-length berth or couch.

It will be seen that by combining the single- and double-occupancy rooms in this way, either by alternating a single-occupancy room A with a double-occupancy room C as shown in Fig. 2, or by arranging a double-occupancy room C between two single-occupancy rooms A and B as shown in Fig. 3, the capacity of a normal length passenger car may be increased materially, say to 40 to 42 passengers.

The alternative arrangement shown in Figs. 9 to 13, inclusive, will now be described.

In these figures, the arrangement of the rooms being generally similar to that shown in the preferred form of Fig. 1, the alternate rooms are designated by the same reference letter A', B', etc.

These rooms also have a boot or extension 19' extending longitudinally to lengthen the rooms to accommodate a full-length berth in the region of the boot. They differ primarily from the arrangement of the preferred form in that the boots 19' of the "A'" rooms are arranged adjacent the ceiling 18 so that the flat bottom 40 of the boot is disposed well above the top of the seat 20 of the adjacent room B', see Figs. 10, 11, 12 and 13.

Thus, ample head room is provided for the person seated in said seat.

Figure 10:
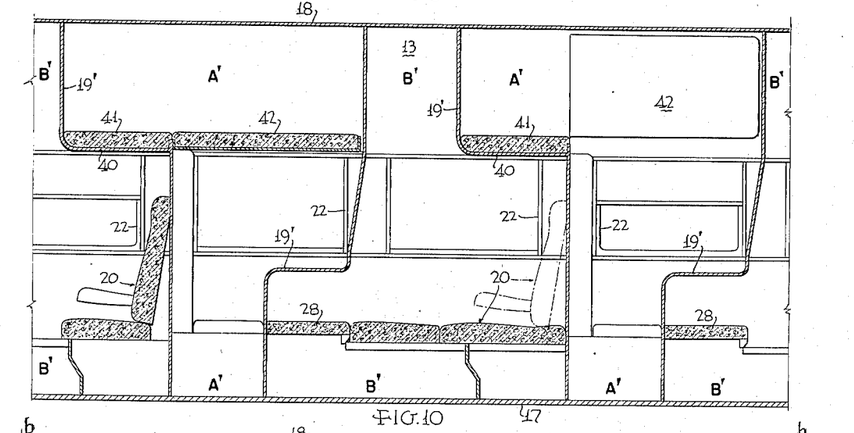
Fig. 10 is an enlarged fragmentary sectional view through some of the rooms of Fig. 9, the section being taken substantially along the line 10—10 of Fig. 9 and showing some of the rooms made up for daytime and some for nighttime occupancy.
Figure 11:
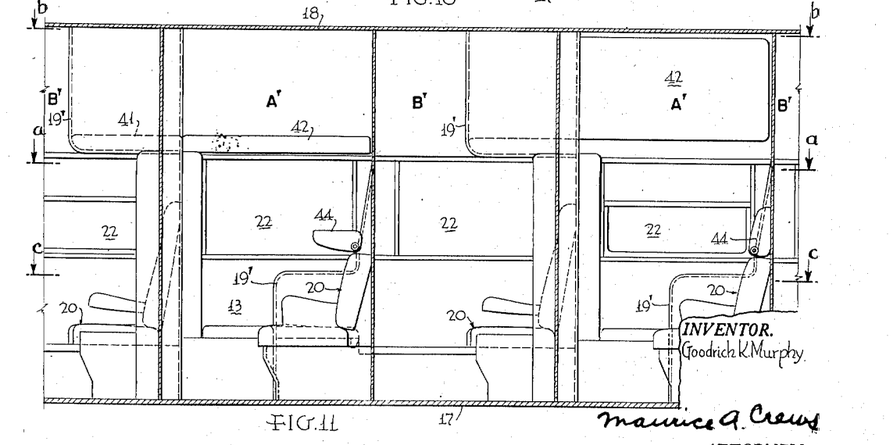
Fig. 11 is a view similar to Fig. 10, but the section being taken substantially along the line 11—11 of Fig. 9.

The berth in room A' comprises a fixed portion 41, Fig. 10, resting on the flat bottom 40 of the associated boot, and a portion 42 hinged to the outside wall 13, so that it may be folded against said wall, as shown at the right of Figs. 10 and 11, or lowered to the use position in alignment with the fixed portion 41 to form the full-length berth, as shown at the left of Figs. 10 and 11.

In this modification, the seats 20 in the "A'" rooms are arranged, as in the preferred form, along the aisle wall, as 11, and the hopper 30 and folding washbasin and cabinet 34 are arranged along the car side wall, as 13, in the corner of the room diagonally opposite the seat. With this arrangement, a person can sit in the "A'" room when the berth is made up for use.

The upper berth may be reached by a folding step, not shown in these figures, but shown and described in connection with Fig. 8, hinged to the boot 19' projecting into room A' and another step formed by the top of the boot.

In room B', the seat 20 is opposite the boot recess opening into the room, which boot recess contains a fixed berth portion as in the preferred form, which with the movable seat and seat back cooperates to form a full-length berth as in the preferred form, except that in this case the head rest is integrated with the seat back as in Fig. 8.

Figure 9:
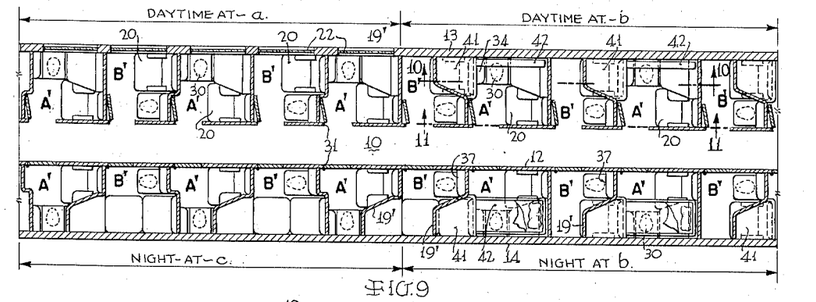
Fig. 9 is a view similar to Fig. 1 showing an alternative arrangement of single-occupancy rooms, the sections being taken at the planes indicated at top and bottom of the figure and by the section lines a, b and c of Fig. 11.

In this room, the hopper, folding washbasin and cabinet unit 37 is arranged alongside the seat 20 and between it and the aisle wall, see Fig. 9. The cushion covering the hopper seat forms a transverse extension of the seat.

It will be seen that this arrangement, the hopper in both rooms is always available, either when the rooms are made up for daytime or nighttime use. This is made possible, in the limited space available, by placing the berths in the "A'" rooms at the high level shown.

Figure 12:
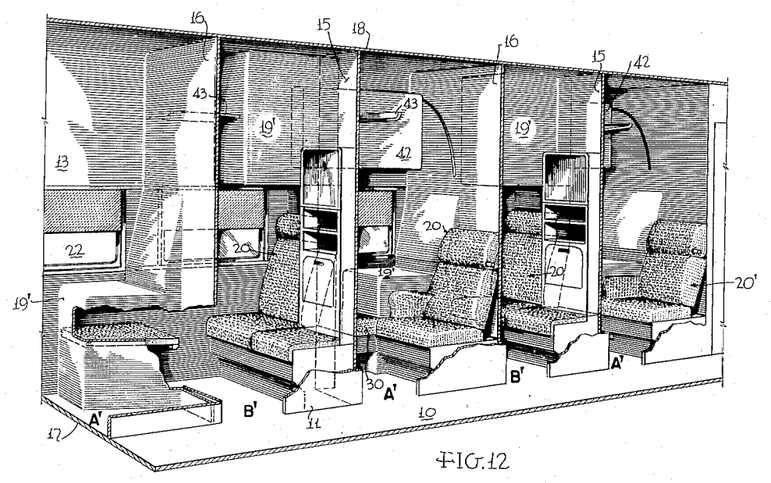
Fig. 12 is an enlarged fragmentary perspective view of the room arrangement as shown at the top of Fig. 9, parts of the aisle and transverse walls being broken away to show the room interiors.
Figure 13:
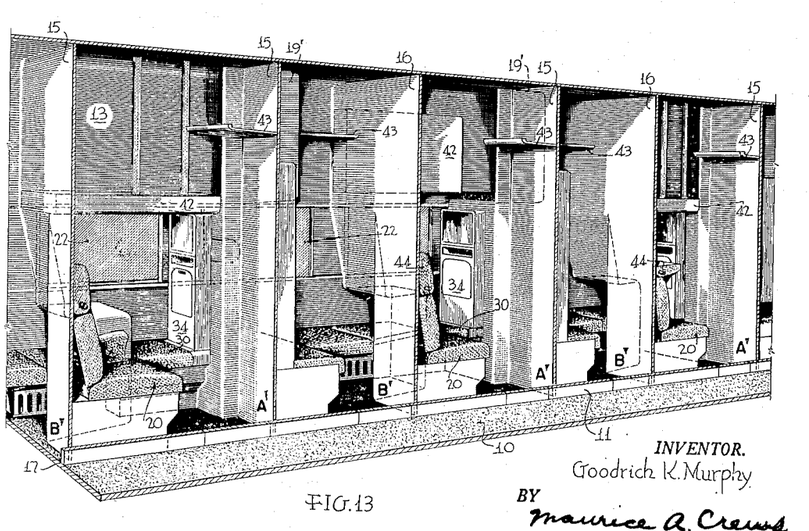
Fig. 13 is a view similar to Fig. 12 but looking longitudinally outwardly in the opposite direction and showing the rooms made up for nighttime or reclining occupancy, as shown at the bottom of Fig. 9.

In this form of room arrangement, the baggage racks 43 may be mounted as shown, on the transverse walls 15 separating the rooms, for the "A'" rooms, and on the outside wall 13, for the "B'" rooms, see Figs. 12 and 13.

The head rests 44 in the "A'" rooms have been shown movable from the normal position shown at the right of Fig. 11 to the horizontal position forming a shelf, as shown at the left of Fig. 11. The head rests of the preferred form of Figs. 1, 5 and 6 could, of course, be similarly mounted, if desired.

While several specific embodiments of the invention have been shown and described, it will be understood that changes and modifications may be made by those skilled in the art without departing from the spirit and scope of the invention.

What is claimed is:

1. In a passenger-carrying vehicle, a longitudinally extending vehicle side wall, a longitudinally extending center aisle wall and longitudinally spaced generally transversely extending partitions dividing at least a portion of the space between said side and aisle walls into a series of single-occupancy rooms adapted to permit the occupant either to sit or recline full length therein, said transverse partitions each being formed with a longitudinally offset portion of materially less width and materially less height than the maximum width and height of the rooms, said offset portions in the partitions being arranged alternately adjacent the aisle wall and adjacent the car side wall and forming, with the associated longitudinally extending walls, longitudinal extensions or boots which increase the length of each room in the region of its offset just sufficiently to permit the use of a full-length couch or berth therein.

2. In a center-aisle passenger-carrying vehicle having side and aisle walls, transverse walls dividing at least a portion of the space between a side wall and an aisle wall into a pair of adjoining compartments, a window in each of said compartments, the transverse wall between said compartments for a width less than one-half the maximum width of said compartments being longitudinally offset so as to extend into one of said compartments for a substantial distance to provide a boot-like extension of the other compartment, making said other compartment in the region of said boot-like extension of a length equal substantially to the length of a full-length berth, the top of said extension being horizontal and at a level not above the sill of the window in said one compartment, said extension being adjacent one of said side and aisle walls, a seat in said one compartment disposed between said extension and the other of said side and aisle walls, a convertible seat in the other of said compartments located adjacent said one of said side and aisle walls in longitudinal alignment with said extension, and a horizontal berth portion within said extension substantially at the level of the cushion of said last-named seat, the cushion and back of said last-named seat being movable to form a horizontal continuation of said berth portion extending longitudinally of the vehicle whereby to form a full-length berth.

3. In a center-aisle passenger-carrying vehicle having side and aisle walls, transverse walls dividing at least a portion of the space between a side wall and an aisle wall into a pair of adjoining rooms, the transverse wall between said rooms for a width not more than half the maximum width and for a height not more than half the maximum height of said rooms being longitudinally offset so as to extend into one of said rooms for a substantial distance to provide an extension of the other room, said extension being adjacent one of said side and aisle walls, a seat in said one room disposed between said extension and the other of said side and aisle walls, a seat in the other of said rooms in longitudinal alignment with said extension, the length of said other room in the region of said extension being approximately equal to the length of a full-length berth.

4. In a passenger-carrying vehicle, a single-occupancy room adapted to permit the occupant either to sit or recline full length therein, said room being defined by longitudinally extending vehicle side and center aisle walls and spaced transverse walls interconnecting said vehicle side and aisle walls, at least one of said transverse walls being formed with a longitudinally offset portion of materially less width and of materially less height than the maximum width and the maximum height of the room, said offset portion in the partition being arranged adjacent one of said longitudinally extending walls and forming therewith a longitudinal extension or boot which increases the length of the room in the region of the offset just sufficiently to permit the use of a full-length berth or couch therein.

5. In a passenger-carrying vehicle, a longitudinally extending vehicle side wall, a longitudinally extending center aisle wall and longitudinally spaced generally transversely extending partitions dividing at least a portion of the space between the side and aisle walls into a series of single-occupancy rooms adapted to permit the occupant either to sit or recline full length therein, said transverse partitions each being formed with a longitudinally offset portion of not more than half the maximum width and height of the rooms, said offset portions in the partitions being arranged alternately adjacent the aisle wall and adjacent the car side wall and forming, with the associated longitudinally extending walls, longitudinal extensions or boots which increase the length of each room in the region of its offset to approximately the length of a full-length berth or couch.

6. In a center-aisle passenger-carrying vehicle having side and aisle walls, partition elements between and providing with said side and aisle walls a plurality of passenger compartments, said partition elements forming the forward and rearward end walls of said compartments, each compartment having in its forward end wall a forwardly projecting extension of the compartment of a width generally less than one-half the maximum compartment width and of a height less than one-half the maximum compartment height, a fixed horizontal berth portion in each extension, and movable means in each compartment movable to a horizontal position adjacent said fixed berth portion and in alignment therewith to provide a full-length passenger berth of substantially the length of the room in the region of said extension.

7. In a center-aisle passenger-carrying vehicle having side and aisle walls, fixed partition elements extending between said walls and providing therewith a plurality of passenger compartments, the partition elements that form the forward end walls of said compartments each having a forwardly extending offset of not more than one-half the maximum width and not more than half the maximum height of the compartment, the offset in the end wall between a forward compartment and a next rearward compartment forming a longitudinal extension of said rearward compartment, and the offset in the other end wall forming a longitudinal extension of said forward compartment, a fixed horizontal berth portion in each of said extensions, and means in each of said compartments movable to a horizontal position in alignment with the fixed berth portion, the fixed berth portion and said means, when horizontally aligned with each other, constituting a full-length berth of substantially the length of the room in the region of said extension.

8. In a center-aisle railway passenger car having side and aisle walls, a plurality of transverse walls dividing at least a portion of the space between a side wall and an aisle wall into a plurality of compartments, said compartments having a common floor level, a single-occupancy seat in each of said compartments, said seats facing in the same direction longitudinally of the car, the seats in alternate compartments being adjacent the car side wall and the seats in compartments intermediate the alternate compartments being adjacent the car aisle wall, each of said compartments having a compartment extension of materially less width and height than the maximum width and height of the compartment and formed in the transverse wall that faces the seat thereof, the compartment extension of each of said alternate compartments being disposed between said car side wall and the seat in the next forward intermediate compartment and having a berth portion therein horizontally aligned with the seat cushion of the seat of such compartment, the seat cushion and seat back of such seat being movable to cooperate and form with said berth portion a passenger berth, the compartment extensions of said intermediate compartments being at such different locations in the transverse walls than the other extensions as not to interfere with the sitting and sleeping positions of passengers in said intermediate compartments, and a horizontal berth portion in each of said last-named compartment extensions for cooperation with other berth-forming parts in said intermediate compartments to form full-length berths extending substantially the full length of the respective compartments.

9. In a passenger-carrying vehicle, a longitudinally extending vehicle side wall, a longitudinally extending center aisle wall and longitudinally spaced generally transversely extending partitions dividing at east a portion of the space between the side and aisle walls into a series of single-occupancy rooms adapted to permit the occupant either to sit or recline full length therein, each of said series of rooms being provided with a longitudinally facing seat of less width than the associated room disposed adjacent a transverse wall thereof, the seats in the series of rooms being arranged alternately adjacent the aisle and the car side wall and facing in the same direction, said transverse partitions opposite the respective seats being each provided with offset portions forming, with the adjacent longitudinally extending walls, extensions or boots occupying the space between the seat of an adjoining room and a longitudinal wall remote from said seat, said extensions or boots being of materially less width and height than the maximum width and height of the rooms and increasing the length of each room in the regions of the offsets to approximately the length of a full-length berth, a fixed berth portion in each extension or boot, the seat being convertible into a berth portion forming with said fixed berth portion a full-length berth in each room.

10. In a passenger-carrying vehicle, a single-occupancy room adapted to permit the occupant either to sit or recline full length therein, said room being defined by longitudinally extending vehicle side and center aisle walls and spaced transverse walls interconnecting said car side and aisle walls, a longitudinally facing seat of less width than the room disposed adjacent one transverse wall and along one longitudinal wall thereof, the opposite transverse wall being formed adjacent said one longitudinal wall with a longitudinally extending offset portion forming, with said adjacent longitudinal wall, a longitudinal extension or boot of less width than the seat and of materially less height than the maximum height of the room, said extension or boot increasing the length of the room in the region of the offset to approximately the length of a full-length berth, a fixed berth portion in said extension or boot, the seat being convertible into a berth portion forming with said fixed berth portion a full-length berth.

11. In a passagenger-carrying vehicle, a room designed for single occupancy and for permitting the occupant to sit or recline full length therein and defined by longitudinally extending vehicle side and center aisle walls and spaced transverse walls interconnecting the car side and center aisle walls, said walls extending between the floor and the ceiling of the room, one of said transverse walls being generally planar inwardly from one of said longitudinally extending walls for at least half of the maximum width of the room and for the remaining width being formed with a longitudinally offset portion forming, with the adjacent longitudinal walls, a longitudinal extension or boot of materially less height than the maximum height of the room and projecting into the room, and the other of said transverse walls having a similar generally planar portion extending inwardly for at least half of the maximum width of the room from the other of said longitudinally extending walls and for the remaining width being formed with a longitudinally offset portion forming, with the adjacent longitudinal walls, a longitudinal extension of boot of a height generally corresponding to said first-named extension or boot and projecting outwardly of the room, said last-named offset providing a recess opening into the room and increasing the length of the room in the region of the offset portion to approximately equal the length of a full-length berth.

12. In a passenger-carrying vehicle, a room designed for single occupancy and for permitting the occupant to sit or recline full length therein and defined by longitudinally extending vehicle side and center aisle walls and spaced transverse walls interconnecting the side and center aisle walls, one of said transverse walls being generally planar inwardly from one of said longitudinal walls for the greater portion of the maximum width of the room and for the remaining width being formed with a longitudinally offset portion providing a longitudinal extension or boot of materially less height than the maximum height of the room and projecting into the room, a longitudinally facing seat disposed adjacent said planar portion of the transverse wall, the other of said transverse walls having a similar generally planar portion extending inwardly for the greater portion of the maximum width of the room from the other of said longitudinally extending walls and for the remaining width being formed with a longitudinally offset portion providing a longitudinal extension or boot of a height generally corresponding to the height of said first-named extension or boot and projecting outwardly of the room, said last-named offset portion providing a recess opening into the room and increasing the length of the room in the offset portion to approximately equal the length of a full-length berth, a berth portion disposed in said recess, and the seat being convertible into a berth portion forming, with the berth portion in the recess, a full-length berth.

13. In a passenger-carrying vehicle, a longitudinally extending vehicle side wall, a longitudinally extending center aisle wall and longitudinally spaced generally transversely extending partitions dividing at least a portion of the space between the car side and aisle walls into a series of single-occupancy rooms adapted to permit the occupant either to sit or recline full length therein, said transverse partitions each being formed with a longitudinally offset portion of materially less width and materially less height than the maximum width and height of the rooms, said offset portions being arranged adjacent one of said longitudinally extending walls and alternately adjacent the floor and adjacent the ceiling and forming, with the associated longitudinal wall, longitudinal extensions or boots which increase the length of each room in the region of its offset to approximately the length of a full-length berth or couch.

14. In a passenger-carrying vehicle, a longitudinally extending vehicle side wall, a longitudinally extending center aisle wall, and transverse partition elements dividing at least a portion of the space between said longitudinally extending walls into a pair of adjoining rooms, a seat in each room facing longitudinally, the seat in one room being adjacent the side wall and the seat in the other room being adjacent the aisle wall and both said seats facing in the same longitudinal direction, the forward partitions of each room being formed with a longitudinally offset portion of materially less height and materially less width than the maximum height and width of the rooms, said offsets forming longitudinal extensions of the room which increase the length of each room in the region of its offset to approximately the length of a full-length berth.

15. In a passenger-carrying vehicle, a longitudinally extending vehicle side wall, a longitudinally extending center aisle wall, and longitudinally spaced generally transversely extending partitions dividing at least a portion of the space between the car side and aisle walls into separate rooms, said rooms comprising at least one pair of adjoining rooms one of which is a double-occupancy room and the other a single-occupancy room, said double-occupancy room having oppositely facing seats arranged along the car side wall and being of a length approximately equal to a full-length berth, said seats being of materially less width than the width of the room, and said single-occupancy room having the transverse wall separating it from the double-occupancy room formed, adjacent the aisle wall, with a longitudinally offset portion forming with said aisle wall, a longitudinal extension or boot of materially less height than the maximum height of the room and extending into the space between the adjacent seat of said double-occupancy room and the aisle wall, the length of the single-occupancy room in the region of the extension or boot being approximately equal to a full-length berth.

16. In a passenger-carrying vehicle, a longitudinally extending car side wall, a longitudinally extending center aisle wall, and longitudinally spaced generally transversely extending partitions dividing at least a portion of the space between the car side and aisle walls into separate rooms, said rooms comprising at least one series of three separate rooms, the intermediate room of the series being a double-occupancy room and the other two, single-occupancy rooms, said double-occupancy room having oppositely facing seats arranged along the side wall and being of a length approximately equal to the length of a full-length berth, said seats being of materially less width than the width of the room, one of said single-occupancy rooms having the transverse wall thereof separating it from the double-occupancy room formed with a longitudinal offset adjacent the aisle wall, said offset forming with the aisle wall a longitudinal extension or boot of materially less height than the maximum height of the room and projecting into the space between the adjacent seat and the aisle wall of the adjoining double-occupancy room, the other single-occupancy room having its transverse wall remote from the double-occupancy room formed with a longitudinal offset adjacent the car side wall, which offset forms with the adjacent car side wall a longitudinal extension or boot of a height similar to said first-named extension or boot, the length of the single-occupancy rooms in the region of their respective longitudinal extensions or boots being approximately just sufficient to receive a full-length berth in each room.

GOODRICH K. MURPHY.

REFERENCES CITED

The following references are of record in the file of this patent:

UNITED STATES PATENTS

| Number | Name | Date |
|---|---|---|
| 2,208,679 | McCarroll | July 23, 1940 |

FOREIGN PATENTS

| Number | Country | Date |
|---|---|---|
| 374,713 | France | Apr. 24, 1907 |
| 418,629 | Germany | Sept. 15, 1925 |